US011261567B2

(12) United States Patent
Kemper et al.

(10) Patent No.: US 11,261,567 B2
(45) Date of Patent: Mar. 1, 2022

(54) METHOD AND DEVICE FOR THE PRODUCTION OF A FIBROUS MATERIAL WEB IN A PAPERMAKING MACHINE

(71) Applicant: VOITH PATENT GMBH, Heidenheim (DE)

(72) Inventors: Martin Kemper, Weingarten (DE); Heiko Held, Heidenheim (DE); Cordts Monteiro Wagner, Heidenheim (DE); Thomas Martin, Langenau (DE)

(73) Assignee: Voith Patent GmbH, Heidenheim (DE)

( * ) Notice: Subject to any disclaimer, the term of this patent is extended or adjusted under 35 U.S.C. 154(b) by 310 days.

(21) Appl. No.: 16/476,158

(22) PCT Filed: Jan. 17, 2018

(86) PCT No.: PCT/EP2018/051043
§ 371 (c)(1),
(2) Date: Jul. 5, 2019

(87) PCT Pub. No.: WO2018/153576
PCT Pub. Date: Aug. 30, 2018

(65) Prior Publication Data
US 2019/0352851 A1     Nov. 21, 2019

(30) Foreign Application Priority Data
Feb. 24, 2017  (DE) .................... 10 2017 103 847.7

(51) Int. Cl.
*D04H 1/425*        (2012.01)
*D04H 1/732*        (2012.01)
(Continued)

(52) U.S. Cl.
CPC ................. *D21F 9/00* (2013.01); *B27N 3/12* (2013.01); *B27N 5/00* (2013.01); *B27N 5/02* (2013.01);
(Continued)

(58) Field of Classification Search
CPC .......... D04H 1/732; D04H 1/26; D04H 1/425; B27N 3/04; B27N 3/12; B27N 5/00;
(Continued)

(56) References Cited

U.S. PATENT DOCUMENTS

| 4,100,324 A | 7/1978 | Anderson et al. |
| 4,311,555 A * | 1/1982 | Reinhall ................. B27N 3/04 |
| | | 162/206 |

(Continued)

FOREIGN PATENT DOCUMENTS

| CA | 955094 A | 9/1974 |
| CN | 1107132 C | 4/2003 |

(Continued)

*Primary Examiner* — Mary Lynn F Theisen
(74) *Attorney, Agent, or Firm* — Laurence A. Greenberg; Werner H. Stemer; Ralph E. Locher

(57) ABSTRACT

A device and a method for the production of a fiber mat is suitable in particular for use in the production of packaging board or fibrous construction elements, from a fibrous source material. The method includes providing the fibrous source material, low-water processing of the fibrous source material in an airflow into raw material including individual fibers and/or fiber bundles, forming of the individual fibers and/or fiber bundles in the airflow by a dry forming method into a fiber mat in such a way that a spatial or three-dimensional structure is formed by the fiber mat and consolidation of the formed fiber mat. The specific volume of the fiber mat is greater than 1.6 cm$^3$/g, in particular greater than 2 cm$^3$/g, preferably greater than 3 cm$^3$/g, and the fiber mat thickness ≥1 mm, in particular ≥1.5 mm, preferably ≥2 mm.

19 Claims, 4 Drawing Sheets

(51) Int. Cl.
*D21F 11/12* (2006.01)
*D21F 11/02* (2006.01)
*B27N 5/02* (2006.01)
*B27N 5/00* (2006.01)
*D21F 9/00* (2006.01)
*B27N 3/12* (2006.01)
*D04H 1/26* (2012.01)
*B32B 3/28* (2006.01)

(52) U.S. Cl.
CPC ............... *D04H 1/26* (2013.01); *D04H 1/425* (2013.01); *D04H 1/732* (2013.01); *D21F 11/02* (2013.01); *D21F 11/12* (2013.01); *B32B 3/28* (2013.01)

(58) Field of Classification Search
CPC . B27N 5/02; D21F 11/02; D21F 11/12; D21F 9/00; D21F 9/02
See application file for complete search history.

(56) References Cited

U.S. PATENT DOCUMENTS

| | | | |
|---|---|---|---|
| 4,474,846 A | * | 10/1984 | Doerer ............... D04H 1/58 |
| | | | 442/415 |
| 10,350,784 B2 | | 7/2019 | Murayama et al. |
| 2004/0192136 A1 | | 9/2004 | Gusky et al. |
| 2016/0332325 A1 | | 11/2016 | Murayama et al. |
| 2019/0070819 A1 | * | 3/2019 | Larsson ............... B29C 43/10 |

FOREIGN PATENT DOCUMENTS

| | | |
|---|---|---|
| CN | 106062267 A | 10/2016 |
| DE | 69900994 T2 | 7/2003 |
| DE | 102009042362 A1 | 4/2011 |
| EP | 3112513 A1 | 1/2017 |
| WO | 9957353 A1 | 11/1999 |
| WO | 0029668 A1 | 5/2000 |
| WO | 2005013873 A1 | 2/2005 |

* cited by examiner

METHOD AND DEVICE FOR THE PRODUCTION OF A FIBROUS MATERIAL WEB IN A PAPERMAKING MACHINE

BACKGROUND OF THE INVENTION

Field of the Invention

The invention concerns a method for the production of a fiber mat, which is suitable in particular for use in the production of packaging board or fibrous construction elements, from a fibrous source material, as well as a device for the implementation of the method and a packaging board produced according to the method.

In the prior art, packaging board is configured as corrugated board, for example. This consists of a corrugated medium, which is arranged between two liner boards and is glued to these to form a unit. The corrugated medium functions as spacer between the liner boards, in order to ensure a required bending stiffness of the corrugated board. The corrugated medium and the liner boards are manufactured in each case on papermaking machines in paper mills. Production of the corrugated board takes place subsequently on site or in other mills in a corrugator. The corrugation is produced there from the corrugated medium at a higher temperature and by moistening of the corrugated medium on corrugating rolls and is glued to the liner boards. The corrugated medium and the liner boards are produced in papermaking machines in conventional process steps. Taking as the starting point an aqueous fibrous material suspension with a solids content in the region of 10 g/liter, the corrugated medium and the liner board are produced by dewatering, pressing and thermal drying. In the dewatering step, very large quantities of white water are removed from the suspension and are returned in part to the process.

This known production process is complex and requires, on the one hand, a large number of process steps and, on the other hand, large amounts of energy for drying the produced papers and for pumping the large quantiles of water that are needed for wet forming. In addition, suchlike production facilities can only be operated profitably in locations at which sufficient energy and water are available. Other sites can thus only be supplied with packaging board, since a cost is involved in transporting it there.

The disadvantages described here also apply in a similar manner to the production of core plies in door leaves. Corrugated mediums or honeycomb-shaped paper elements, for example, which are faced on both sides with wooden sheets, are used there as construction elements for the core ply.

SUMMARY OF THE INVENTION

The object of the invention is accordingly to propose a less costly method with lower energy input, as well as a simple device, for the production of packaging board or construction elements and to avoid the disadvantages of known methods.

The object is accomplished by the following steps. A method for the production of a fiber mat is proposed, which is suitable in particular for use in the production of packaging board or fibrous construction elements, from a fibrous source material, comprising the following steps:
a. providing the fibrous source material;
b. low-water processing of the fibrous source material in the airflow into raw material comprising individual fibers and/or fiber bundles;
c. forming of the individual fibers and/or fiber bundles in the airflow by a dry forming method into a fiber mat in such a way that a spatial structure is formed by the fiber mat;
d. consolidation of the formed fiber mat with a spatial structure,
wherein the specific volume of the fiber mat is greater than 1.6 $cm^3/g$, in particular greater than 2 $cm^3/g$, preferably greater than 3 $cm^3/g$, and wherein the fiber mat thickness is 1 mm, in particular 1.5 mm, preferably ≥2 mm.

The source material containing fibrous material can include, at least in part, virgin fibers, bamboo, straw, bagasse or recycled material. The recycled material can contain corrugated board waste and/or cardboard waste and/or recovered paper and/or paper waste or cardboard waste from the paper production, and also products which have been produced from the fiber mat, as well as market pulps.

Packaging board, for example, can be produced from the fiber mat with a spatial structure. The packaging board consisting at least in part of the fiber mat is preferably further processed into products such as packaging boxes, for example. These can be used as fruit boxes or vegetable boxes.

No virgin fibers or less expensive virgin fibers must be used if a fibrous recycled material is utilized as a source material. The products produced from the fiber mat recycled material can advantageously also be utilized as recycled material.

In addition to the simplified production method, the produced fiber mat differs from conventionally produced corrugated mediums in respect of its high specific volume and, at the same time, a high fiber mat thickness and the spatial structure of the fiber mat, which can be coordinated simply with the utilization of the corrugated board in order to achieve good functional properties. The spatial structure can thus contain corrugated, zigzag-shaped structures or also local, crater-shaped depressions and elevations. This means that the design of the core ply of packaging boards is no longer restricted to the corrugated form and can be chosen almost at will. For example, a packaging board with uniform bending stiffness in all directions can be produced in this way. When the fiber mat is utilized as a substitute for the corrugated mediums in the corrugated board, adequate spacing of the liner boards and accordingly, for example, good bending stiffness of the corrugated board is also assured in return for a minimal use of individual fibers and/or fiber bundles. The low-water processing of the fibrous source material, as well as the forming of the individual fibers and/or fiber bundles in the airflow into a fiber mat with a spatial structure by a dry forming method, is associated with the need for only small quantities of water, and therefore only a low energy input is required, for example, for the pumps for the supply of water. The mode of operation of dry forming methods is already familiar, for example, from document WO200/29668. The inventors have recognized that this method is particularly suitable for the production of fiber mats for packaging board and for construction elements having the described properties. In the production of construction elements, for example the core ply of wooden doors, the spatial structure can include corrugated, zigzag-shaped structures or also local, crater-shaped depressions and elevations.

In a further application, construction elements such as insulating materials, for example for house construction, can be produced by the inventive method.

The specific volume of the fiber mat is preferably restricted to ≤10 cm³/g. As a result, an adequate compressive strength is assured over the thickness of the fiber mat.

An increasing amount of goods are being ordered from online shops at the present time. A result of this is an increase in the movement of goods by the dispatch of the goods in packaging boxes. In a practical embodiment, it is particularly advantageous if the method is undertaken in the vicinity, in particular on site, of mail-order companies or packaging manufacturers in industrialized regions. The packing and the dispatch of goods can thus be combined with the production of packaging board and, where appropriate, packaging boxes. The packaging boxes that are used are processed into new packaging boxes according to the inventive method in a cost effective and environmentally friendly manner. The new packaging boxes can also be adapted simply by this flexible method in respect of their size and form to the new products to be packed. The recycled material in this case can be collected economically within a radius of 100 km from the site of the facility for the implementation of the method. If the method is implemented in packaging manufacturers' premises, the paper waste or packaging board waste, for example waste which occurs during cutting to size, which arises there in the known method for packaging board production, can also be processed into new packaging boards and packaging boxes. The implementation of the method is particularly suitable in the premises of mail-order companies or packaging manufacturers, since no in-house production-related waste water treatment plants are required and are present there.

The method also lends itself advantageously to the production of fiber mats at locations in dry, water-deprived regions of the tropical or subtropical climate zones, since only small quantities of water are required. For the drying of the fiber mats to a final dry substance content, it can be sufficient to utilize an air impingement drying device and/or a through-flow drying device, wherein the warm and dry ambient air can be used as a drying medium. The inventive solution can be applied particularly advantageously under these boundary conditions.

For the reduction of transport costs, it is advantageous if the recycled material as a source material is collected in a small radius of preferably about 100 km from the site of the implementation of the method.

The method is particularly suitable for a large number of recycling cycles without impairing the quality of the fiber mats to an excessive degree, in particular in respect of their strength characteristics. The short recycling loop means that the environment is protected and is not impacted by packaging that is no longer required and by other recovered paper.

In a practical case, the final dry substance content of the fiber mat is ≥80%, in particular ≥85%, and preferably ≥90%, wherein the dry content, as is customary in paper technology, is expressed as the ratio of the dry mass to the overall mass of the fiber mat.

In a practical application, process steps a) to d) are embodied in such a way that the water content of the total mass of the source material and the raw material does not exceed 40%, preferably 30%, in particular 20%.

Processing step b.) comprises preferably at least one step from the following group: comminution of the source material to a maximum size of 60 mm mal 60 mm; freeing of the source material from impurities; disaggregation of the source material in individual fibers and/or fiber bundles in high-consistency refiners and/or in cross-flow defiberizer and/or in mills; freeing of the individual fibers and/or fiber bundles from impurities after the comminution step.

The length of the individual fibers and/or fiber bundles can be set advantageously in or after the comminution step to less than 4 mm, in particular to less than 3 mm.

The comminution step can be implemented so that the source material is not disaggregated completely into individual fibers, but that it contains fiber bundles and specks. Less energy is required by this lower intensity of the comminution step.

In an advantageous embodiment, the individual fibers and/or fiber bundles in the airflow are applied to the surface of a support element in forming stage c.), wherein the support element can be embodied as air-permeable or air-impermeable.

The airflow can be heated in relation to the ambient temperature, preferably to a temperature greater than 30° C., and preferably greater than 40° C. Saturated or unsaturated water vapor can also be mixed with the airflow. At the same time, heating of the individual fibers and/or the fiber bundles is achieved as a result, and their bonding to one another is facilitated. Forming and deposition of the individual fibers and/or of the fiber bundles is improved in addition.

If an air-permeable support element is utilized, it can be embodied as a rotating or stationary belt, for example a woven screen or felt or a porous membrane, or as a perforated roll or as a perforated plate.

The surface of the support element can also exhibit complementary structures for the spatial structure of the fiber mat to be produced. The complementary structures of the support element can differ accordingly, depending on the utilization of the fiber mat exhibiting a spatial structure. The complementary, spatial structures can thus comprise corrugated, zigzag-shaped or also local, crater-shaped depressions and elevations, if the fiber mat is used as a core ply between two liner boards in the production of packaging board. The complex method for the production of traditional corrugated board can thus be simplified.

It is also possible for the spatial structure of the fiber mat to correspond to the spatial form of a product produced from the fiber mat, for example a fruit box. This leads to a reduction in the number of production steps for suchlike products. Cutting-out or stamping-out, folding and adhesive bonding can be dispensed with, at least in part.

In a practical case, a binding agent can be added for binding the individual fibers and/or fiber bundles in at least one of steps b.), c.), d.). Preferably starch is used as a binding agent. It is also possible, however, to add melt bonding fibers and/or thermoplastics, which melt at higher temperature and adhesively bond the individual fibers and/or fiber bundles, in particular at their points of intersection.

In a practical embodiment, the binding agent in consolidation step d.) is activated by at least one step from the following group: steaming with, for example, saturated or unsaturated steam; moistening with water; irradiation with microwaves; heating by hot contact surfaces; impingement with hot air, for example by means of an air impingement drying device, and optionally with a gas-heated drying hood.

In a further embodiment, the binding agent is added to the airflow and is mixed with the individual fibers and/or fiber bundles. The mixing step can be implemented by a static mixer.

If the binding agent is added in forming step c), this can take place via a separate feed device.

It is also possible to press the fiber mat during and/or after forming stage c.). The desired thickness and/or the desired specific volume can be adjusted in this way. This step is preferably implemented in accordance with the procedure in the forming step. For example, the solids content in the airflow, that is to say the concentration of the individual fibers and/or of the fiber bundles and/or of the pressure on the fiber mat as it forms during forming can be influenced.

In a further embodiment, the fiber mat can be produced continuously and can be rolled up subsequently.

In a preferred further development, the fiber mat can be produced with linear embossing, wherein the linear embossing exhibits a contour which is adapted to the product to be produced from the fiber mat. The fiber mat can be locally weakened by the linear embossing, for example by perforation, so that the contour is able to separate easily from the rest of the fiber mat. The embossing can be implemented with an embossing roll, for example, which exhibits the linear contour as a raised rib on the roll shell.

The linear embossing can also be embodied as non-perforating. In this case, the contour is simply visually highlighted, so that the contour can be cut out by hand or mechanically from the fiber mat in a following step.

It is also conceivable, however, to apply the linear embossing already during the forming step. In this case, the deposition of the individual fibers and/or of the fiber bundles is controlled in such a way that the regions of the contour lines exhibit fewer individual fibers and/or fiber bundles.

It is also possible for the fiber mat not to be produced continuously as reel material, in particular in the forming step, but to be produced by the piece as cut-to-size sheets. In this case, it is possible for the spatial structure of the fiber mat to correspond to the spatial form of a product produced from the fiber mat, for example a fruit box. These products are produced by the piece as a unit.

In a further variant embodiment, the fiber mat is produced as a multi-ply product. A number of individual forming steps for forming of the respective ply are performed advantageously one after the other. It is also conceivable, however, for the individual forming steps to be performed synchronously. The individual fibers and/or fiber bundles of the individual plies can originate from the same source material or also from different source materials.

The fiber mat is attached appropriately to further plies and/or is folded and/or transformed in at least one further processing step, in particular in order to create a spatial structure, for example a packaging box or an intermediate ply, as a substitute for the corrugated mediums of the known corrugated board between two top plies of a packaging board, and/or is surface finished, for example by the application of a coat containing a pigmented coating color. The fiber mat can serve as a substitute for the corrugated medium in comparison with known corrugated board. In this case, it is possible for the further plies that are to be attached to the fiber mat to be embodied as top plies, which are produced according to the conventional method. The top plies can also be produced according to the inventive method, however. Advantageously, at least one top ply is adhesively bonded to the fiber mat on the upper side and on the underside of the fiber mat respectively.

The invention also concerns packaging board, in particular foodstuffs packaging board, which at least in part consists of the fiber mat produced according to the method. The packaging board consisting at least in part of the fiber mat is preferably further processed into products such as packaging boxes, for example. These can be used as fruit boxes or vegetable boxes.

The invention also concerns a packaging container, in particular a foodstuffs packaging box, which at least in part consists of the fiber mat with a spatial structure produced according to the method.

The invention also concerns a device for the implementation of the method for the production of a fiber mat, which is suitable in particular for use in the production of packaging board or fibrous construction elements, from a fibrous source material, with a processing plant for the low-water processing of the fibrous source material in the airflow into a raw material, which comprises individual fibers and/or fiber bundles, and with a dry forming device for forming the individual fibers and/or fiber bundles in the airflow into a fiber mat in such a way that a spatial structure is formed by the fiber mat, and with a consolidation device for the consolidation of the formed fiber mat, wherein the specific volume of the fiber mat is greater than 1.6 $cm^3/g$, in particular greater than 2 $cm^3/g$, preferably greater than 3 $cm^3/g$, and wherein the fiber mat thickness is $\geq 1$ mm, in particular $\geq 1.5$ mm, preferably $\geq 2$ mm.

The processing plant and the dry forming device and the consolidation device are preferably embodied in such a way that the water content of the total mass of the source material and the raw material does not exceed 40%, preferably 30%, in particular 20%.

The device for the implementation of the method can be of mobile embodiment. In one practical case, it can be dimensioned so compactly that it is suitable for transport in a transport container, for example in an overseas shipping container. This has the advantage that the device can be almost completely assembled or preassembled at the manufacturing site and can subsequently be transported to the production site. This is particularly advantageous if the device is used in locations in dry, water-deprived regions of the tropical or subtropical climate zones.

BRIEF DESCRIPTION OF THE SEVERAL VIEWS OF THE DRAWING

Further characterizing features and advantages of the invention can be appreciated from the following description of preferred illustrative embodiments with reference to the drawings.

DESCRIPTION OF THE INVENTION

Figure 1:
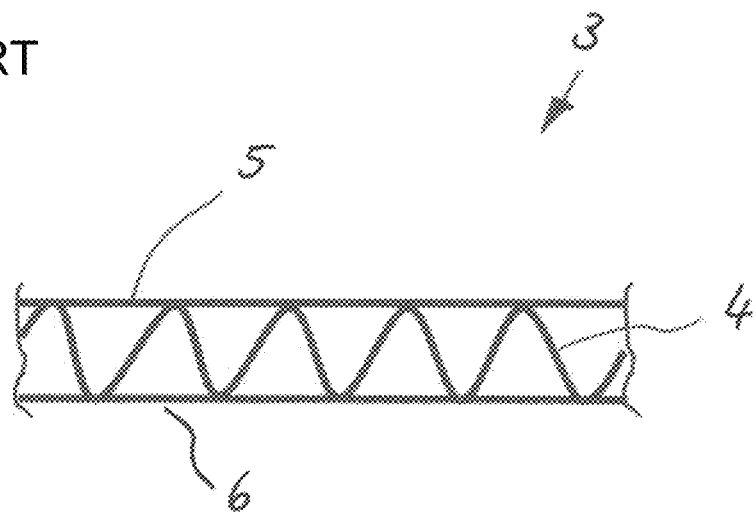
FIG. 1 depicts an embodiment of a corrugated board according to the prior art.

FIG. 1 depicts a detail of a familiar embodiment of a corrugated board 3 in cross section. In the prior art, packaging board is configured as corrugated board 4, for example. This consists of a corrugated medium 4, which is arranged between two liner boards 5, 6 and is adhesively bonded to these to form a unit. The corrugated medium 4 functions as a spacer between the liner boards 5, 6, in order to assure a required bending stiffness of the corrugated board 3. The corrugated medium 4 and the liner boards 5,6 are produced in each case on papermaking machines in paper mills. The production of the corrugated board 3 subsequently takes place in a corrugator on site or in other mills. The corrugation is produced there from the corrugated medium 4 at a higher temperature and by moistening of the corrugated medium on corrugating rolls and is adhesively bonded to the liner boards 5, 6. The corrugated medium 4 and the liner boards 5, 6 are produced in papermaking machines in conventional process steps. Starting with an aqueous fibrous material suspension with a solids content in the region of 10 g/liter, the corrugated medium 4 and the liner board 5, 6 is produced by dewatering, pressing and thermal drying. Very large quantities of white water are removed from the suspension in the dewatering step and are returned in part to the process. This known production process is complex and requires, on the one hand, a large number of process steps and, on the other hand, high quantities of energy for drying the produced papers and for pumping the large quantities of water that are released during wet forming.

Figure 2:
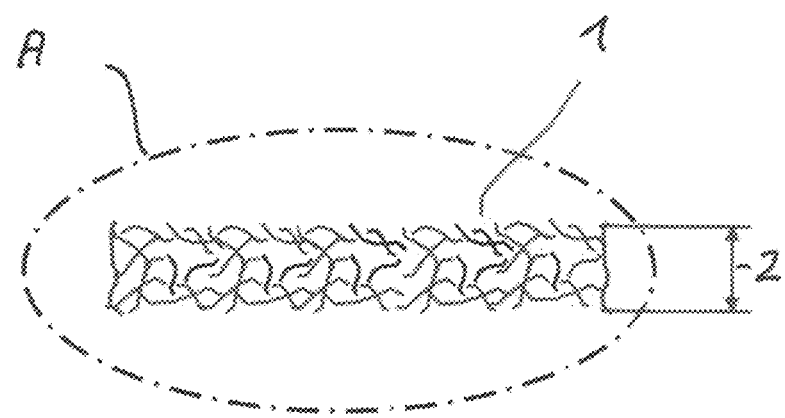
FIG. 2 depicts a detail of an inventive fiber mat in an enlarged, schematic representation.

In FIG. 2 a detail A of an inventive fiber mat 1 is depicted in an enlarged, schematic representation in cross section, which exhibits a thickness 2 of more than 1 mm and a specific volume of greater than 1.6 cm$^3$/g. Detail A is intended to depict only the structure of the fiber mat 1. A representation of the spatial structure of the fiber mat 1 was accordingly dispensed with in this representation. Examples of the fiber mat 1 with a spatial structure are depicted in FIGS. 3a to 3d. The represented individual fibers and fiber bundles are arranged essentially anisotropically, that is to say their orientation does not exhibit a preferred direction in this example. It is also possible, however, to design the forming process so that a statistical orientation of the individual fibers and/or of the fiber bundles is present, that is to say the frequency distribution of the layer of individual fibers and/or fiber bundles exhibits a preferred direction within the volume of the fiber mat. The preferred direction can point along or crosswise to the production direction or in the direction of thickness. The individual fibers and/or the fiber bundles are present inside the fiber mat 1 in a loose association, wherein the specific volume nevertheless does not exceed the value of 10 cm$^3$/g. The specific volume is calculated from the ratio of the thickness and the weight per unit area of the fiber mat 1. The individual fibers and/or the fiber bundles are bonded to one another at the point of contact with one another by the starch binding agent to form a unit.

Figure 3A:
FIG. 3a depicts an embodiment of an inventive fiber mat with a spatial structure.
Figure 3B:
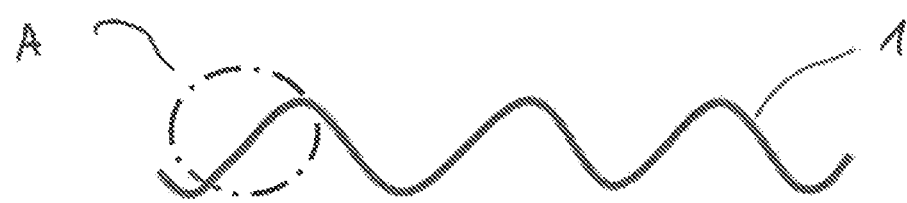
FIG. 3b depicts a further embodiment of an inventive fiber mat with a spatial structure.
Figure 3C:
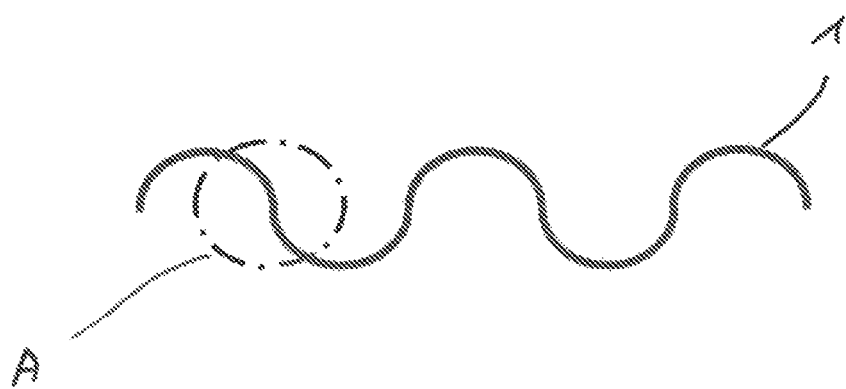
FIG. 3c depicts a further embodiment of an inventive fiber mat with a spatial structure.
Figure 3D:
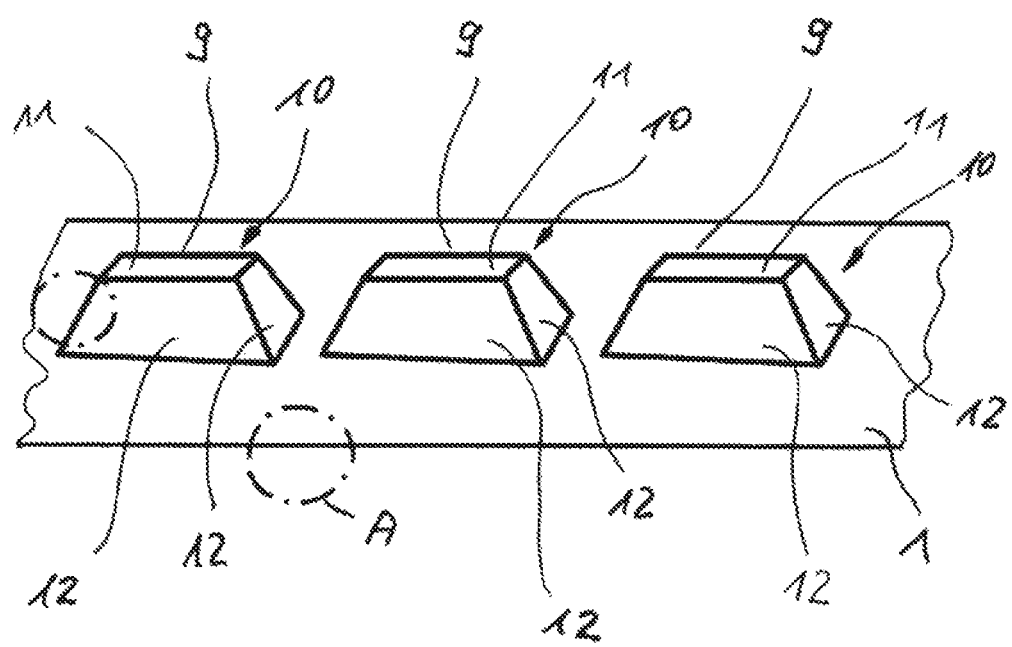
FIG. 3d depicts a further embodiment of an inventive fiber mat with a spatial structure.

FIG. 3a depicts an embodiment of an inventive fiber mat with a spatial structure 1. The fiber mat 1 serves as a substitute for the corrugated medium in the known corrugated board. In this case, the fiber mat 1 is attached to further top plies, not represented here, which are produced according to the conventional method. However, the top plies can also be produced according to the inventive method. A top ply is adhesively bonded to the fiber mat 1 respectively on the upper side and on the underside of the fiber mat. Detail A is illustrated in FIG. 2 in an enlarged and in a schematic representation. In this example, the spatial structure of the fiber mat has a zigzag-shaped form. Further possible spatial structures of the fiber mat 1 are depicted in FIGS. 3b to 3d. The respective detail A is illustrated in FIG. 2 in an enlarged and in a schematic representation. A sinusoidal, corrugated structure is depicted in FIG. 3b, and a corrugated spatial structure formed from semicircles is depicted in FIG. 3c.

The fiber mat 1 can be produced continuously as reel material as a substitute for the corrugated mediums and can be further processed subsequently.

The fiber mat 1 can also be produced by the piece as cut-to-size sheets 9 and can be further processed into products such as packaging boxes 10, for example. These can be used as fruit boxes or vegetable boxes. An inventive fiber mat 1 with a spatial structure is depicted in a perspective representation in FIG. 3d. The detail A of the fiber mat 1 is in turn shown in an enlarged representation in FIG. 2. The form of the spatial structure of the fiber mat 1 is adapted to the product to be produced from the fiber mat 1. In the present example, this is the product of three packaging boxes 10. The spatial structure of the fiber mat 1 corresponds to the spatial form of a product produced from the fiber mat. In this example, three packaging boxes 10, which each exhibit a floor 11 and side walls 12. In order to obtain the individual packaging boxes 10, these must be cut out by hand or mechanically in a following step, that is to say separated from the remaining fiber mat 1. The represented packaging boxes 10 do not have a lid in this example. Handle openings, for example, can be cut out from the side walls 12 in a further process step. The represented packaging boxes 10 are formed in the forming stage on an air-permeable support element, which is embodied as a rotating belt. The surface of the support element exhibits complementary structures to the packaging boxes 10 to be produced.

In the forming stage, the individual fibers and/or the fiber bundles can also be deposited only in the region of the structure of the supporting belt. The packaging boxes 10 are thus produced individually by the piece as cut-to-size sheets 9. In this case, which is not represented here, they do not have to be separated from the rest of the fiber mat 1, but are removed only from the structure of the supporting belt.

Figure 4:
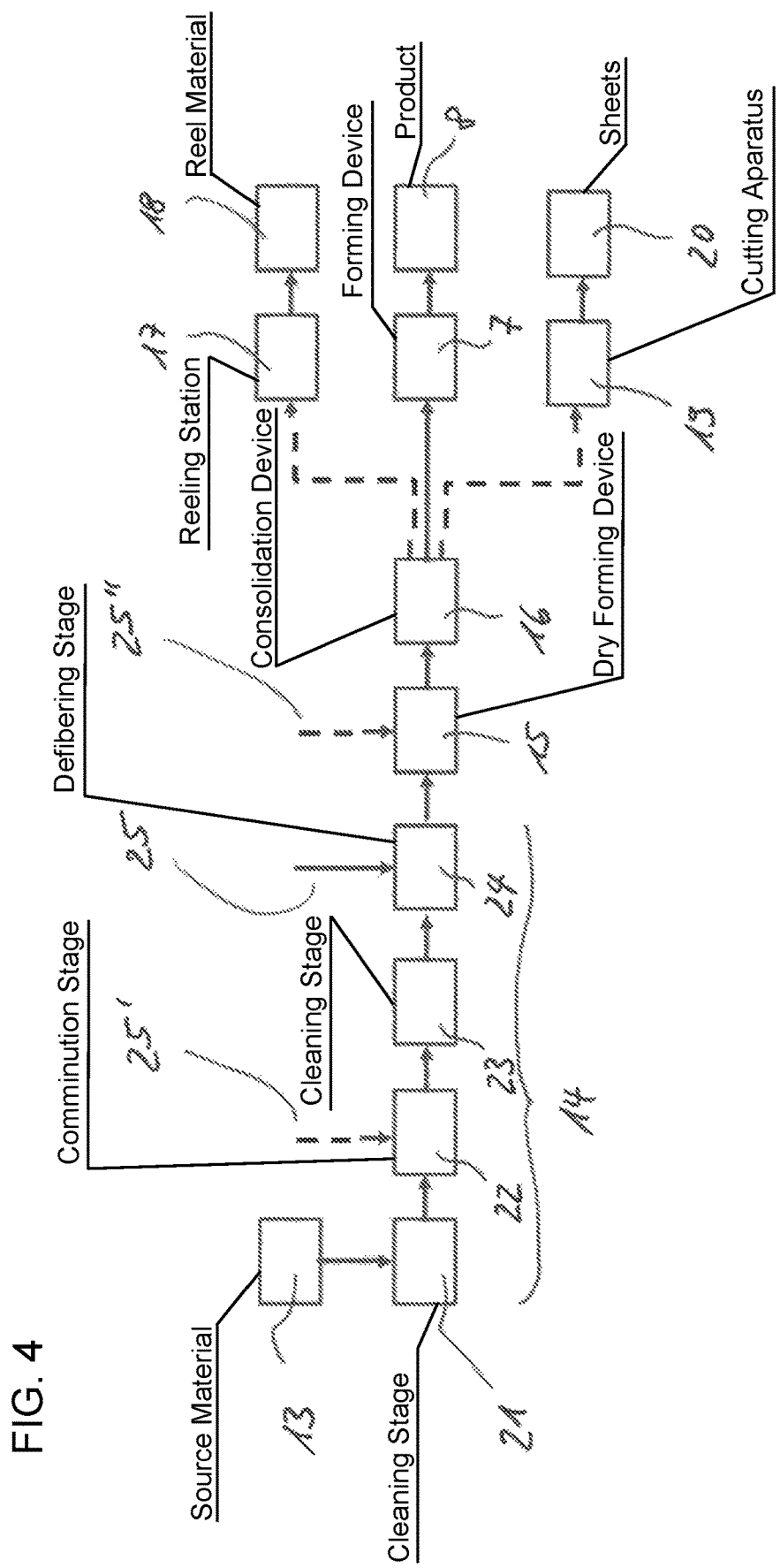
FIG. 4 depicts an exemplary production process in a schematic representation for the production of the inventive fiber mat with a spatial structure.

Depicted by way of example in FIG. 4 is a production process for the production of the inventive fiber mat 1. The collected source material 13 containing fibrous material, comprising corrugated board waste and/or cardboard waste and/or recovered paper and/or paper waste or cardboard waste from paper production, is prepared for the processing plant 14, wherein the individual fibers and/or the fiber bundles undergo low-water processing. The water content of the total mass of the source material in this case is always less than 40%. The source material 13 containing fibrous material is processed in the airflow in the processing plant 14 into raw material for the forming stage. The source material 13 containing fibrous material is cleaned of metallic objects and coarse dirt in a cleaning stage 21. The cleaning stage 12 comprises a metal detector or a gravity separator. Coarse comminution of the fibrous source material 13 to an individual piece size of less than or equal to 60 mm by 60 mm then takes place in a comminution stage 22, which can include a 2-shaft shredder or a cutting mill. A further, optional cleaning stage 23 can then be provided, in which impurities can be removed by means of gravity separators or centrifugal separators, for example, air separators or cyclones and metal separators. This is followed by the disaggregation of the comminuted source material into individual fibers and/or fiber bundles in a defibering stage 24—likewise in the airflow. The resulting raw material is fed to a dry forming device 15 for forming of the individual fibers and/or fiber bundles. This involves feeding the raw material onto the surface of a rotating, air-permeable screen as a support element in the airflow via a distribution device with guide plates or mixing units. To assist forming, a suction box for sucking air from the forming zone is provided on the area situated opposite the surface. After the forming stage, consolidation takes place in a consolidation device 16. A binding agent, in this example starch, is used for consolidation. The addition of a binding agent 25 takes place in the defibering stage 24. The addition of a binding agent 25', 25" in the comminution stage 22 or in the dry forming device 15 is proposed as an option. The binding agent can be activated by the application of heat in the consolidation stage 16. The fiber mat can be steamed or irradiated for this purpose, for example with microwaves, or can be brought into contact with hot surfaces. Consolidation can also take place by spraying with water or by pressing. In the case of the endless production of the fiber mat 1, this is rolled up in a reeling station 17 and is transported as reel material 18 for further processing. In the case of production of the fiber mat 1 by the piece, this is fed to a cutting apparatus 19 in this example. There, the intended contour of the remaining fiber mat 1 is cut out on the product to be produced from the fiber mat 1 and is dispatched as cut-to-size sheets. In a further alternative embodiment, the fiber mat 1 produced with a spatial structure can be transformed into a product 8 in a forming device 7.

LIST OF REFERENCE DESIGNATIONS 1 fiber mat
2 thickness
3 corrugated board
4 corrugated medium
5 liner board
6 liner board
7 forming device
8 product
9 cut-to-size sheets
10 packaging box
11 floor
12 side walls
13 source material
14 processing plant
15 dry forming device
16 consolidation device
17 reeling station
18 reel material
19 cutting apparatus
20 cut-to-size sheets
21 cleaning stage
22 comminution stage
23 cleaning stage
24 defibering stage
25 addition of binding agent
25' addition of binding agent
25" addition of binding agent
A detail

The invention claimed is:

1. A method for the production of a fiber mat suitable for use in the production of packaging board or fibrous construction elements from a fibrous source material, the method comprising the following steps:
   a) providing the fibrous source material;
   b) processing of the fibrous source material having a water content of less than 40% of a total mass of the source material in an airflow into raw material including at least one of individual fibers or fiber bundles;
   c) forming the at least one of individual fibers or fiber bundles in the airflow by a dry forming method into a fiber mat having a three-dimensional structure; and
   d) then consolidation of the formed three-dimensional fiber mat to provide a specific volume of the fiber mat greater than 1.6 cm$^3$/g and a fiber mat thickness ≥1 mm.

2. The method according to claim 1, which further comprises providing the specific volume of the fiber mat to be greater than 2 cm$^3$/g and providing the fiber mat thickness to be ≥1.5 mm.

3. The method according to claim 1, which further comprises providing the specific volume of the fiber mat to be greater than 3 cm$^3$/g and providing the fiber mat thickness to be ≥2 mm.

4. The method according to claim 1, wherein the fibrous source material at least partly includes virgin fibers, bamboo, straw, bagasse or recycled material.

5. The method according to claim 1, which further comprises carrying out the method at locations in dry, water-deprived regions of tropical or subtropical climate zones or in a vicinity of or on site of mail-order companies or packaging manufacturers in industrialized regions.

6. The method according to claim 1, which further comprises carrying out steps a) to d) to provide a ratio of a water content to a total mass of the source material and the raw material not exceeding 40%.

7. The method according to claim 1, which further comprises carrying out steps a) to d) to provide a ratio of a water content to a total mass of the source material and the raw material not exceeding 30%.

8. The method according to claim 1, which further comprises carrying out steps a) to d) to provide a ratio of a water content to a total mass of the source material and the raw material not exceeding 20%.

9. The method according to claim 1, which further comprises carrying out processing step b) as at least one step selected from the following group:
   comminution of the source material to a maximum size of 60 mm by 60 mm;
   freeing the source material from impurities;
   disaggregation of the source material into at least one of individual fibers or fiber bundles in at least one of high-consistency refiners or cross-flow defiberizers or mills; and
   freeing at least one of the individual fibers or fiber bundles from impurities after the comminution step.

10. The method according to claim 1, which further comprises carrying out forming step c) by applying the at least one of individual fibers or fiber bundles in the airflow to a surface of an air-permeable or air-impermeable support element.

11. The method according to claim 10, which further comprises providing the air-permeable support element as a rotating or stationary belt or as a perforated roll or as a perforated plate.

12. The method according to claim 10, which further comprises providing the surface of the support element with structures complementary to the three-dimensional structure of the fiber mat to be produced.

13. The method according to claim 1, which further comprises adding a binding agent for binding the at least one of individual fibers or fiber bundles in at least one of steps b), c) or d).

14. The method according to claim 1, which further comprises producing the fiber mat continuously.

15. The method according to claim 1, which further comprises producing the fiber mat by the piece.

16. The method according to claim 1, which further comprises producing the fiber mat as a multi-ply product.

17. A device for the production of a fiber mat suitable for the production of packaging board or fibrous construction elements from a fibrous source material, the device comprising:

- a processing plant for processing of the fibrous source material having a water content of less than 40% of a total mass of the source material in an airflow into a raw material including at least one of individual fibers or fiber bundles;
- a dry forming device for forming the at least one of individual fibers or fiber bundles in the airflow into a fiber mat having a spatial three-dimensional structure; and
- a consolidation device disposed downstream of said dry forming device for consolidating the formed three-dimensional fiber mat to provide a specific volume greater than 1.6 cm$^3$/g and a fiber mat thickness ≥1.

18. The device according to claim 17, wherein said consolidation device consolidates the formed fiber mat to provide a specific volume greater than 2 cm$^3$/g and a fiber mat thickness ≥1.5 mm.

19. The device according to claim 17, wherein said consolidation device consolidates the formed fiber mat to provide a specific volume greater than 3 cm$^3$/g and a fiber mat thickness ≥2 mm.

* * * * *